Aug. 2, 1949.                  A. S. PRATT                   2,477,896
           ADAPTER AND HOLDING MEANS FOR PICTURE FILM
             TRANSPARENCIES OF DIFFERENT FRAME
                 SIZES IN PROJECTING APPARATUS
Filed Nov. 5, 1945                              2 Sheets-Sheet 1
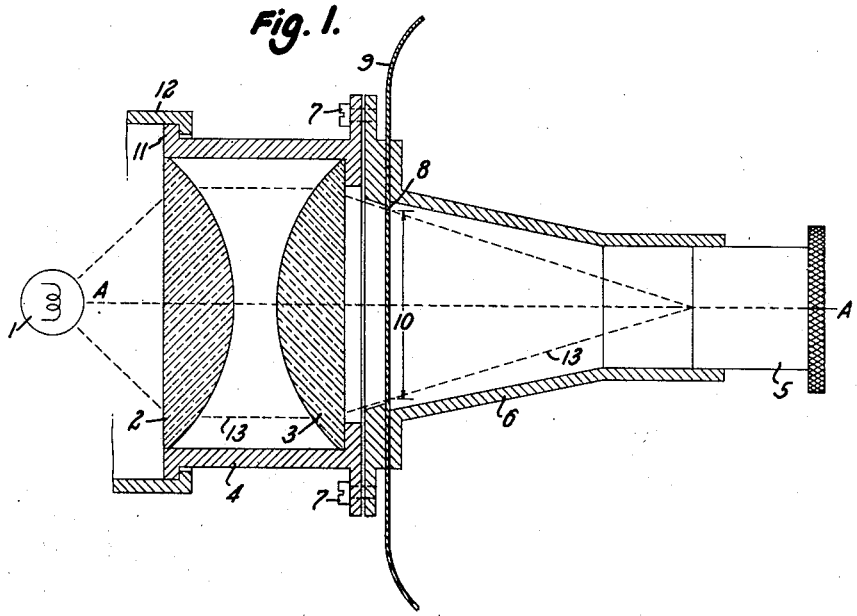
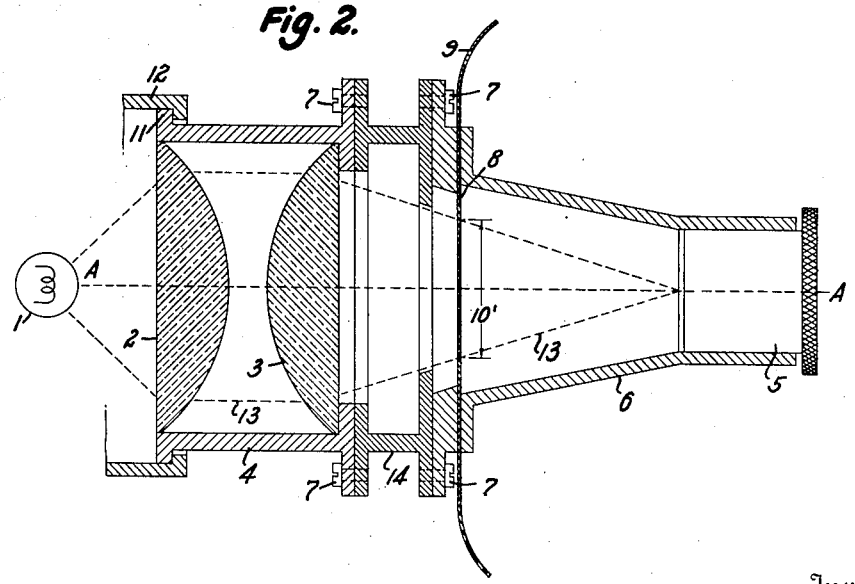
Inventor:
Albert Stanley Pratt,
By  Pierce & Scheffler,
                Attorneys.

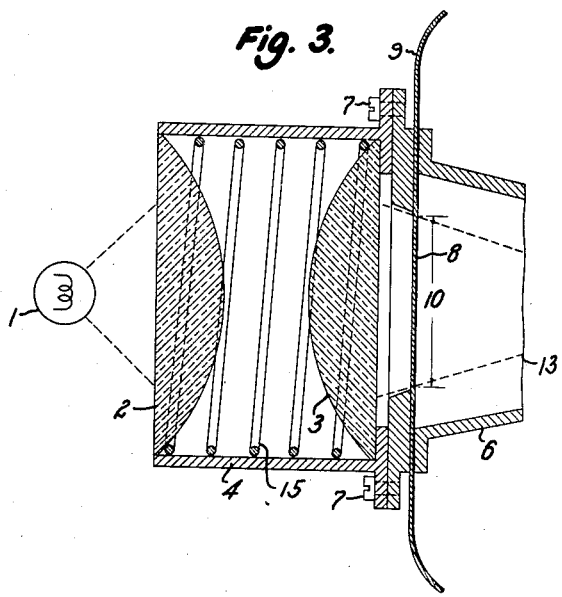
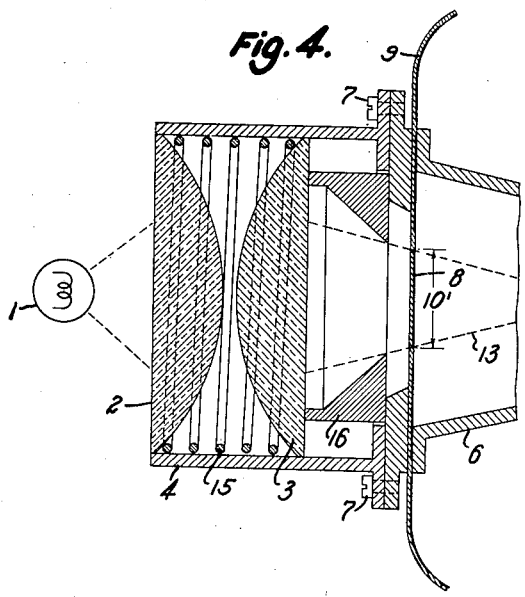

Patented Aug. 2, 1949

2,477,896

UNITED STATES PATENT OFFICE 2,477,896

ADAPTER AND HOLDING MEANS FOR PICTURE FILM TRANSPARENCIES OF DIFFERENT FRAME SIZES IN PROJECTING APPARATUS

Albert Stanley Pratt, London, England, assignor to British Acoustic Films Limited, London, England Application November 5, 1945, Serial No. 626,769
In Great Britain April 11, 1945

2 Claims. (Cl. 88—24)

This invention relates to apparatus for projecting transparencies, that is to say, lantern slides, illustrations and pictures on single pieces of film, or on a strip or reel of film, or any similar type of transparency; and the invention is more particularly concerned with apparatus for the projection of transparencies of different sizes and with a quick interchange from one frame size to another.

Heretofore, in such types of projectors, the arrangement has been to employ masks of different sizes which have been placed over the transparency when it is of smaller than the maximum size of transparency which the projector is designed to handle. In most known types of projector the picture gate and, consequently, the mask has had a fixed relationship with respect to the condenser lens system. This has the disadvantage that, when smaller sized transparencies are projected, there is a very considerable diminution of the amount of light passing through them since the mask itself cuts off a great deal of the light due to the fact that it bears a fixed relationship to the condenser lens system and must, therefore, obstruct the light beam when it is of smaller dimensions than the said beam.

An object of the present invention is to overcome this disadvantage and to provide an apparatus which can project picture transparencies of different frame sizes but, at the same time, by a simple adapter arrangement can pass the maximum, or substantially the maximum, amount of light through the transparency and onto the screen, irrespective of the size of the picture transparency.

According to the present invention, in apparatus for projecting transparencies of different sizes, an adapter unit is inserted between the condenser lens system and the transparency so as to alter the position of the transparency in the converging light beam and simultaneously to mask it and flood it with the maximum amount of light.

The invention will now be described with reference to the accompanying drawings, wherein:

Fig. 1 illustrates, diagrammatically, the arrangement of the lens system and picture gate assembly for projecting a transparency;

Fig. 2 illustrates, diagrammatically, an arrangement similar to Fig. 1 but with an adapter unit for projecting a smaller transparency;

Fig. 3 illustrates, diagrammatically, a modified arrangement of the condenser lens system; and Fig. 4 illustrates the arrangement shown in Fig. 3 but with a modified form of adapter unit for projecting smaller transparencies.

Referring to Fig. 1 of the accompanying drawings, the reference numeral 1 identifies a source of light that may be an incandescent lamp. A condenser lens system 2, 3 is shown mounted in a housing 4. An objective lens system 5 is adjustably mounted in a further housing 6, the adjustable mounting enabling the picture image to be correctly focused on the picture screen. The objective lens housing 6 is detachably secured to the condenser lens housing 4 by means of screws 7. Any other form of quickly detachable fixing may be employed, however, such as a bayonet-type fixture or a clip fixture. The objective lens housing also carries a picture gate 8 which, as shown on the drawing, is integral with it. If desired, a separate detachable picture gate may be employed.

A picture transparency 9 is held in position by the gate 8. The drawing shows the transparency 9 as a strip of film having a series of picture frames one of which is indicated by the bracket 10. Suitable means for passing the strip of film through the gate 8 are employed but these are not shown as they do not form part of the present invention. Any other suitable form of picture transparency, such as a lantern slide, may of course be projected by the illustrated apparatus.

The cylindrical housing 4 may be provided with a flange 11 which interfits with a support member 12, whereby the housing 4 and the parts assembled therewith can be turned as a unit about the axis A—A to orient transparencies of rectangular outline.

The apparatus as illustrated in Fig. 1 is used for the maximum size of picture transparency which it is desired to project. In operation, the light beam 13 from the source 1 passes through the condenser lens system 2, 3, through the transparency frame 10 and the objective lens 5, by means of which it is focused on a suitable screen.

It will be observed that substantially the whole of the light beam 13 passing through the condenser lens system, is transmitted through the picture transparency. Further, as indicated, it is preferable to construct the assembly so that it is rotatable about its axis A—A for the purpose of correctly positioning the pictures in the gate 8. For this purpose, both the housing 4 and housing 6 may be rotatable about the axis A—A, as herein provided, or only the housing 6 carrying the picture gate 8 may be rotatable. Both housings may be held in position by means of indent mechanism (not shown) and may be mounted on a turret for the purpose of rotating and orientating the picture transparency.

In practice it is often desired to project picture transparencies of different sizes; for example, it may be desired to project a picture from a transparency smaller than that shown by the frame 10 in Fig. 1. Heretofore, this has been effected by placing a masking shield over part of the gate 8. However, such a procedure has the very great drawback that a considerable amount of light is lost since the light beam will be partly blocked by the said masking shield.

The present invention provides a device which overcomes this disadvantage and accordingly Fig. 2 illustrates one such arrangement. The source of light 1, condenser lens system, and objective lens system are the same as in Fig. 1. However, Fig. 2 shows the projection of a smaller-sized picture frame 10' than in Fig. 1 but at the same time allows the same amount of light to pass through the said smaller-sized picture 10' as through the larger-sized picture frame 10 illustrated in Fig. 1. This result is achieved by inserting an adapter unit 14 between the condenser lens housing 4 and the transparency. The unit 14 is shown fixed between the two housings 4 and 6 by means of the screws 7, although any other suitable fixture may be used. The axial length of the adapter unit is such that it automatically and simultaneously frames and positions the picture transparency 10' in the converging light beam 13 in the region of the maximum light flux corresponding to the size of the said picture. In Fig. 2, the picture frame 10' is illustrated as one of a series of picture frames in a strip of film 9. By employing different sized adapter units 14 corresponding to different sized picture transparencies, the picture gate 8 can be made to have a movable relationship, as regards distance, with respect to the condenser lens assembly. With such an arrangement, different sized picture transparencies can thus be positioned in the converging light beam and projected with the same, or substantially the same intensity of light.

In Fig. 2, as in Fig. 1, the whole assembly, or some of the assembly, such as the adapter unit 14, is preferably rotatable about the axis A—A for the purpose of orienting the picture image correctly. This may be done by mounting the whole assembly, or the adapter unit 14, in a turret.

Referring now to Figs. 3 and 4, these illustrate a modified form of the invention. In Fig. 3, the source of light is indicated at 1, and the condenser lenses at 2 and 3. In this construction, the two lenses 2 and 3 are held in position in the housing 4 by means of a spring 15, the objective lens housing 6 being secured to the housing 4 as in Fig. 1. The arrangement of the picture gate 8 and film strip 9 is also the same as in Fig. 1, and the picture frame 10 is of maximum size.

Referring to Fig. 4, this illustrates a modified form of adapter unit 16 which is inserted in the end of the housing 4, after the housing 6 has been temporarily removed, to move the lens 3 nearer to the lens 2 against the tension of the spring 15. The housing 6 is then fastened in position by means of the screws 7. The insertion of the adapter unit 16 increases the distance between the picture gate 8 and the condenser lens 3 so that the light beam 13 is converged considerably more by the time it reaches the picture gate than in the arrangement shown in Fig. 3. Consequently, the smaller-sized picture frame 10' is still flooded with substantially the same amount of light since the adapter unit 16 simultaneously and automatically positions and masks the picture frame 10' in the converging light beam 13 at the position of the maximum light flux for that sized transparency.

In both Figs. 3 and 4, as described for the constructions shown in Figs. 1 and 2, the whole or part of the assembly is preferably rotatable about its optical axis for orientating the picture image and, to effect this, the arrangement may be mounted as described or on a rotatable turret or the like.

Since certain further changes can be made in the foregoing constructions without departing from the spirit and scope of this invention, it is intended that all matter shown in the accompanying drawings, or set forth hereinbefore shall be interpreted as illustrative and not in a limiting sense.

I claim:

1. In apparatus for projecting transparencies having picture frames of different sizes, in combination, means for holding any selected one of a plurality of different frame sizes of transparencies in position for projection, means for holding a condenser lens system for converging the light from a light source through the selected transparency in the first mentioned means and a condenser lens system therein, and adapter means interposed between the first and second mentioned means and spacing the same apart, by an amount equal to the width of the adapter means as measured in the direction of the optical axis, the width of such adapter means being correlated to the size of picture frame selected for projection such that the same amount of light converges upon a relatively small picture frame in the transparency as converges upon a relatively large picture frame when the adapter means is omitted.

2. Projection apparatus comprising a housing including a rearwardly positioned picture gate for positioning any selected one of a plurality of transparencies of different sizes in place for projection and a forwardly positioned objective lens system, a condenser lens system and light source positioned rearwardly of said picture gate forming a converging light beam that passes through said gate and objective lens, and an adapter unit insertable between the rear of said housing and said condenser lens system for shifting the former and hence the picture gate along the optical axis of the beam by an amount equal to the width of said adapter unit as measured along the optical axis, the width of said adapter being correlated to the size of transparency selected for projection such that optimum and substantially equal projection light characteristics are established for the said differently sized transparencies.

ALBERT STANLEY PRATT.

REFERENCES CITED

The following references are of record in the file of this patent:

UNITED STATES PATENTS

| Number | Name | Date |
|---|---|---|
| 1,075,789 | Patton | Oct. 14, 1913 |
| 1,636,647 | Patterson | July 19, 1927 |
| 1,720,011 | Stark | July 9, 1929 |
| 1,750,910 | Stark | Mar. 18, 1930 |
| 1,848,253 | Howell | Mar. 8, 1932 |